US010893919B2

(12) United States Patent
Muller et al.

(10) Patent No.: US 10,893,919 B2
(45) Date of Patent: Jan. 19, 2021

(54) OPTIMIZATION OF SUPERSTRUCTURES AND/OR MESOSTRUCTURES IN DENTAL PROSTHESES

(71) Applicant: CADFEM International GmbH, Grafing bei Munchen (DE)

(72) Inventors: Christoph Muller, Munich (DE); Lars Bonitz, Witten (DE)

(73) Assignee: CADFEM INTERNATIONAL GMBH

( * ) Notice: Subject to any disclaimer, the term of this patent is extended or adjusted under 35 U.S.C. 154(b) by 262 days.

(21) Appl. No.: 15/458,210

(22) Filed: Mar. 14, 2017

(65) Prior Publication Data
US 2017/0258562 A1 Sep. 14, 2017

(30) Foreign Application Priority Data

Mar. 14, 2016 (DE) .................. 10 2016 003 084

(51) Int. Cl.
A61C 13/01 (2006.01)
A61C 13/00 (2006.01)
A61C 8/00 (2006.01)

(52) U.S. Cl.
CPC .......... *A61C 13/0004* (2013.01); *A61C 8/005* (2013.01); *A61C 8/0027* (2013.01)

(58) Field of Classification Search
CPC ................... A61C 13/00–34; A61C 8/00–0098
See application file for complete search history.

(56) References Cited

U.S. PATENT DOCUMENTS

| 4,937,928 | A | 7/1990 | Van Der Zel |
| 5,257,203 | A | 10/1993 | Riley et al. |
| 6,398,554 | B1 | 6/2002 | Perot et al. |
| 2005/0080503 | A1* | 4/2005 | Kopelman ......... A61C 13/0004 700/98 |

(Continued)

FOREIGN PATENT DOCUMENTS

| DE | 102005005656 | 1/2006 |
| EP | 1293174 | 3/2003 |

(Continued)

OTHER PUBLICATIONS

Corresponding European Search Report for EP 05003975 dated Jul. 28, 2017.

*Primary Examiner* — Yogesh P Patel
(74) *Attorney, Agent, or Firm* — Belles Katz LLC

(57) ABSTRACT

A method and device for developing a geometry of a superstructure and/or mesostructure for dental prostheses. According to one aspect of the invention a method of developing a geometry of a mesostructure for a dental prosthesis includes the following steps: receiving first 3D data defining a 3D installation space for a mesostructure, receiving second 3D data defining possible positions for attaching the mesostructure, receiving third 3D data defining possible positions or regions for attaching the dental prosthesis to the mesostructure, and developing an optimized geometry of the mesostructure by means of an optimization technique, wherein starting from the 3D installation space the possible positions for attaching the mesostructure and the possible positions or regions for attaching the dental prosthesis to the mesostructure, the geometry of the mesostructure is optimized by means of applying the physical laws.

8 Claims, 2 Drawing Sheets

(56) References Cited

U.S. PATENT DOCUMENTS

| | | | | |
|---|---|---|---|---|
| 2006/0223029 A1* | 10/2006 | Berger | ............ | A61C 13/275 |
| | | | | 433/172 |
| 2007/0238069 A1* | 10/2007 | Lovald | ............ | A61B 17/8085 |
| | | | | 433/173 |
| 2008/0038684 A1* | 2/2008 | Keating | ............ | A61C 13/0004 |
| | | | | 433/24 |
| 2008/0206710 A1* | 8/2008 | Kruth | ............ | A61C 13/0004 |
| | | | | 433/174 |
| 2008/0215093 A1* | 9/2008 | Lin | ............ | A61F 2/4455 |
| | | | | 606/246 |
| 2013/0316302 A1 | 11/2013 | Fisker | | |
| 2014/0178839 A1* | 6/2014 | Berger | ............ | A61C 13/2255 |
| | | | | 433/173 |

FOREIGN PATENT DOCUMENTS

| | | |
|---|---|---|
| EP | 1568335 | 8/2005 |
| FR | 2525103 | 10/1983 |
| KR | 20150010119 | 1/2015 |
| WO | 0219940 | 3/2002 |
| WO | 02076326 | 10/2002 |
| WO | 2004008981 | 1/2004 |
| WO | 2015111766 | 7/2015 |

\* cited by examiner

OPTIMIZATION OF SUPERSTRUCTURES AND/OR MESOSTRUCTURES IN DENTAL PROSTHESES

CROSS-REFERENCE TO RELATED APPLICATIONS

The present application claims priority under 35 § 119 to German Patent Application No. 102016003084.4, filed on Mar. 14, 2016, the entirety of which is incorporated herein by reference.

FIELD OF THE INVENTION

The invention relates to a method and a device for developing a geometry of a superstructure and/or mesostructure in dental prostheses. Furthermore, the invention relates to a computer-readable medium including program code instructions executable by a computer for performing such a method, as well as a computer program including program code means for performing such a method when the program is executed on a computer. In addition, the invention relates to a superstructure and/or mesostructure which is manufactured by using the data generated in the method according to the invention.

BACKGROUND OF THE INVENTION

A distinction is made between e.g. removable dental prostheses and fixed dental prostheses.

Both types of dental prostheses may be attached to both still existing teeth provided with crowns and/or onto implants. In many cases, in particular, in the case of dental prostheses requiring a larger number of abutments (tooth stumps, dental implants or posts and cores) and/or are to replace a larger number of missing teeth, it is not possible or advisable to attach the dental prosthesis directly to the abutments. In such cases a mesostructure, sometimes also called superstructure, is attached to the abutments and the dental prosthesis itself is attached to the mesostructure.

After preparation of the abutments (tooth stumps, dental implants or posts and cores), first of all a "dental impression" of the situation in the mouth in the region of the dental prosthesis to be manufactured is made, e.g. by means of a corresponding negative imprint, which will be converted into a positive model, e.g. a plaster model, in a dental laboratory, which exactly matches the situation in the mouth.

Alternatively, the oral cavity may be "measured" by means of a 3D surface scan, expediently using an intraoral scanner.

Thereupon, a CAD designer, such as a dental technician, in the majority of cases with considerable effort, prepares a computer model with a suitable mesostructure for the dental prosthesis. For example, this may take place manually with the help of a CAD program. In consideration of any existing attachment options for the mesostructure, such as e.g. still existing teeth or already existing implants, the number and arrangement of any further fixed points required, in particular implants, are determined. When dimensioning the mesostructure and defining the (additionally) required implants, the dental technician relies on his knowledge and experience or likewise on the empirical values of other dental technicians. However, the respective individual biomechanical properties of the jawbone are largely disregarded or at least not sufficiently taken into consideration, and in the majority of cases the statics of the mesostructure are not calculated accurately either.

In particular, the result may be that implants are used that do not absorb any load, i.e. implants upon which no force at all or only very little force is exerted during chewing, when the dental prosthesis is inserted, and therefore are actually considered to be superfluous.

In addition, the dental technician frequently dimensions the mesostructures or parts thereof stronger than would be necessary physically, so as to ensure that the mesostructure is sufficiently stable in any event. This leads to additional costs and may also have an adverse effect from an aesthetic point of view.

Among other things, the present disclosure is based on the object to provide a novel method and a novel device for developing a geometry of a mesostructure for dental prostheses.

BRIEF SUMMARY OF THE INVENTION

According to an aspect a method is provided of developing a geometry of a mesostructure for a dental prosthesis, wherein the method comprises the following steps: receiving first 3D data defining a 3D installation space for a mesostructure, receiving second 3D data defining possible positions for attaching the mesostructure, receiving third 3D data defining possible positions or regions for attaching the dental prosthesis to the mesostructure, and developing an optimized geometry of the mesostructure by means of an optimization process, in which connection, starting from the 3D installation space, the possible positions for attaching the mesostructure and the possible positions or regions for attaching the dental prosthesis to the mesostructure, the geometry of the mesostructure is optimized by applying the physical laws, in particular the laws of mechanics Expediently, an optimization technique used may be a topology optimization technique, whereby the optimized geometry of the mesostructure may advantageously be calculated with a computer with the aid of the topology optimization technique.

Optimization techniques allow the optimizing of geometries with respect to defined target values. At the same time, requirements, in particular objective functions and constraints which will be explained in more detail below, can be defined, which are to be taken into consideration when it comes to optimizing. For example, topology optimization constitutes such an optimization technique. In this connection, an installation space, a load scenario, e.g. a load or several loads, a load spectrum or several load spectra or a shift or several shifts and, if applicable, possible fixed points that are part of the optimized mesostructure are predetermined. A single load may be a static bite force or shift, while a load spectrum designates a series of loads, forces or shifts that occur during a chewing cycle or that are meant to represent a chewing cycle.

Hence, it is assumed that either the application of force or load takes place via the possible positions for the attachment of the mesostructure and the distribution of force or load takes place via the possible positions or regions for attaching the dental prosthesis to the mesostructure or that the application of force or load takes place via the possible positions or regions for attaching the dental prosthesis to the mesostructure and the distribution of force or load takes place via the possible positions for attaching the mesostructure.

A three-dimensional installation space expediently defining the maximum spatial expansion of the mesostructure is defined for developing a biomechanically optimized geometry of the mesostructure by means of topology optimization. Advantageously, the attending dentist or oral surgeon specifies the 3-D installation space in consideration of practical and aesthetic aspects. Thus, theoretically the entire oral cavity would be conceivable as installation space, however, the dental prosthesis should still be appropriately positionable, the tongue should have enough room and freedom of motion, and normally it should not be possible to see the mesostructure. Consequently, it is expedient that the dentist/oral surgeon specifies as a starting point for optimization a 3-D installation space which is as large as possible, however, which still complies with the above cited criteria.

Alternatively, a basic shape of the mesostructure may also be specified as 3-D installation space.

The geometry of the mesostructure is advantageously optimized by removing those regions from the 3-D installation space which do not contribute or contribute only slightly to load absorption or load removal, wherein those regions which do not contribute or contribute only slightly to the load absorption or the load removal are ascertained, in that the forces and/or shifts acting on individual regions of the mesostructure are simulated. In this connection, a load absorption falling short of a certain limit value is called "insignificant load absorption" or "insignificant contribution to load absorption," whereby the limit value may be defined beforehand or may be specified by the user.

In this manner, starting, from the specified 3D installation space, the geometry of the mesostructure is optimized successively in several iterations, in which the regions that do not contribute or contribute only insignificantly to the load absorption are removed from the remaining 3-D installation space.

Furthermore, possible positions for attaching the mesostructure are defined for the optimization of the mesostructure.

The possible positions for attaching the mesostructure may include possible positions for one or several implants and/or for the case that the patient still has at least one remaining natural tooth, which after appropriate preparation is suitable for attaching the mesostructure, be the position of the remaining tooth or the positions of the remaining teeth which is/are used for attaching the mesostructure.

The possible position(s) for inserting an implant or several implants for attaching the mesostructure is/are advantageously predetermined by the attending dentist or oral surgeon. Expediently, the dentist or oral surgeon determines the possible position(s) for the insertion of an implant or several implants on the basis of appropriate examinations of the bone structure of the upper jaw and/or the lower jaw or on the basis of already available clinical findings, so that a reliable attachment of the mesostructure and thus a good fit of the dental prosthesis attached thereto are also ensured when the dental prosthesis is under load.

The position(s) of the still existing tooth or the still existing teeth that after appropriate preparation is/are suitable for attaching the mesostructure is/are likewise predetermined by the dentist or oral surgeon. If necessary, he determines the current positions of the existing tooth or the existing teeth one more time, to achieve maximum accuracy. If the attachment of the mesostructure, to which the dental prosthesis is to be attached, additionally requires one or more implants, one or several possible positions are provided for it by the dentist or oral surgeon, as is described above.

In addition, for the optimization of the mesostructure possible positions or regions are defined which are suitable for attaching the dental prosthesis to the mesostructure.

The positions or regions at which the dental prosthesis can be attached depend on the type and quality, that is the individual design of the dental prosthesis and on the type of mesostructure, e.g. web, attachment bars, or special designs. The positions or regions at which the dental prosthesis can be attached are also advantageously predetermined by the attending dentist or oral surgeon or prosthesist.

If the respective mesostructure is made such that the position of the fixed points or attachment regions of the prosthesis is predetermined so as to be variable, that is to say not fixed, then the arrangement of these fixed points or attachment regions of the prosthesis may also be optimized biomechanically.

In a preferred embodiment the number of possible positions for implants is larger than the number of the implants required for the attachment of the mesostructure, so that in the optimization of the geometry of the mesostructure those positions for implants can be ascertained from the overall number of the possible positions for implants which are best suited for attaching the mesostructure. Thus, also the arrangement of the implants for attaching the mesostructure is biomechanically optimized in that a suitable subset of positions for implants is ascertained from the overall number of possible positions. Thus, on the one hand, for example, it is possible to remove a possible position for an implant which absorbs no load or no significant load and, on the other hand, it is possible to avoid too high a load of an individual implant or too high a load absorbed by a single implant. A load absorption below a certain limit value is called "no significant load absorption," whereby the limit value may be defined beforehand or be determined by the user.

Advantageously, at least one of the following goals may be specified for optimizing the geometry of the mesostructure for a load scenario: minimizing the flexibility of the mesostructure; minimizing the shifting at one point or region; minimizing the reaction force at the possible positions for attaching the mesostructure; minimizing the volume of the mesostructure and/or minimizing the weight of the mesostructure.

Advantageously, in the optimization of the geometry of the mesostructure at least one of the given conditions is taken into consideration, the at least one given condition including at least one of the following conditions: permissible maximum reaction force at the possible positions for attaching the mesostructure permissible maximum reaction force at the possible positions or regions for attaching the dental prosthesis to the mesostructure; permissible maximum volume of the mesostructure; permissible maximum weight of the mesostructure; permissible maximum flexibility of the mesostructure, and/or permissible maximum stresses.

In addition, at least one fixed point of the geometry of the mesostructure may be specified as additional condition. If at least one fixed point is specified, this at least one fixed point is necessarily contained in the optimized geometry of the mesostructure.

In this connection, the optimization of the geometry of the mesostructure may be individualized by stating the expected maximum load of the entire mesostructure or, more precisely, of a maximum load scenario to be expected in terms of chewing force and biting force of the person for which the mesostructure and dental prosthesis are manufactured.

Thus, for a person having a rather low maximum biting force the mesostructure may be dimensioned less strong or smaller in size, which, in particular, is of advantage for persons having a small oral cavity. Vice versa, for a person having a high maximum biting force, the mesostructure may be dimensioned stronger or larger, to thus avoid any overloading of individual sections of the mesostructure and thus deformation or even breaking of the mesostructure.

If one can choose from different materials for the mesostructure, their properties may also be included in the optimization of the geometry of the mesostructure by adapting the permissible maximum load of individual sections of the mesostructure to the respective material.

Furthermore, overload of individual implants can be avoided by pre-determining a permissible maximum reaction force at the possible positions for attaching the mesostructure, that is e.g. a permissible maximum load of an individual implant. Stating the expected maximum load of the entire mesostructure or, more precisely, of a maximum overall load absorption to be expected across the possible positions for attaching the dental prosthesis, the optimization of the mesostructure with respect to the biting force of the person for which the mesostructure and the dental processes are manufactured, may be individualized.

The maximum volume or maximum weight, respectively of the mesostructure, permissible maximum stresses and/or a permissible maximum flexibility of the mesostructure may also be specified as an additional condition. Thus, for example, as a permissible maximum flexibility it may be specified that the prosthesis is shifted or deformed by 1 mm at a defined point or region (e.g. place of attachment of the prosthesis and mesostructure).

If one can choose from different materials for the mesostructure, these may also be included in the optimization of the geometry of the mesostructure, by adapting the maximum weight, the permissible maximum stresses and/or the permissible maximum flexibility of the mesostructure to the respective material.

When a combination of different additional, material-depending conditions, e.g. the permissible maximum load of individual sections of the mesostructure, of the maximum weight of the mesostructure, of the permissible stresses and/or the permissible maximum flexibility of the mesostructure is specified, then for each available material the relevant combination of the conditions matching the respective material may be predetermined or tested, respectively. Thus, in the optimization of the geometry of the mesostructure the material to be used may also be "optimized," i.e. the material which is suited best for the individual requirements of the mesostructure.

Advantageously, the above cited goals (objective functions) and conditions (constraints) may be combined in a suitable, i.e. reasonable manner.

Thus, a minimization of the flexibility for a predetermined load scenario and a predetermined volume reduction (e.g. 70%) may take place or a minimization of the volume or mass, respectively for a permissible maximum tension (and the lifetime following therefrom) and/or for the permissible maximum reaction force (e.g., 30N) may take place on the implants.

The expected maximum load scenario of the individual person may be ascertained or estimated by means of an individual measurement, a pre-calculation, e.g. with the aid of FEM or with the aid of specialist literature.

In addition, for the optimization also intoduction-related limitations for the geometry and/or structure of the mesostructure may be given. For example, if the mesostructure is to be milled, the geometry of the mesostructure should be such that it can be milled, i.e. it should not contain any closed cavities.

Advantageously, in the optimization of the geometry of the mesostructure those regions which do not contribute or contribute only slightly to load absorption are removed from the 3D installation space. In the optimization technique the mechanical stress and strain is simulated by e.g. the finite element method (FEM), to ascertain those regions of the mesostructure that do not contribute or contribute only very little to the load absorption. Thus, by an iterative procedure, the geometry of the mesostructure, starting from the 3D installation space, will be improved successively until a biomechanically optimized geometry of the mesostructure is achieved.

In another preferred embodiment the mesostructure may be part of a one-piece construction comprising the mesostructure and a denture. Thus, in the case of a one-piece design of mesostructure and denture the geometry of that part which corresponds to the mesostructure may be optimized with the aid of the method disclosed herein.

According to another aspect a method of manufacturing a mesostructure for a dental prosthesis is provided, the method comprising the following steps: developing a geometry of a mesostructure for a dental prosthesis in accordance with the method of manufacturing a geometry of a mesostructure for a dental prosthesis, defined and illustrated in the above paragraphs, and manufacturing the mesostructure for a dental prosthesis based on the developed geometry of the mesostructure for a dental prosthesis with the aid of a manufacturing method, e.g. by means of a generative/additive manufacturing method or by means of milling.

The mesostructure may expediently be made of a metal or a metal alloy, respectively, a plastic or a ceramic.

Advantageously, cobalt, chromium, molybdenum, titanium or alloys of these metals may be used together with another metal, in particular molybdenum. In addition, zirconium oxide or also plastics that are orally compatible and non-toxic may be used.

For the production or manufacture of the mesostructure based on the previously developed geometry of the mesostructure for a dental prosthesis a suitable production or manufacturing method may be selected, depending on the desired material of the mesostructure. This may include generative manufacturing methods, also named as additive manufacturing methods or 3D printing, such as e.g. sintering, laser sintering, selective laser melting or electron beam melting for metals and metal alloys and stereolithography or fused deposition modeling for plastics. Mesostructures made of metal or metal alloys may also be milled, wherein the production related limitations in milling are advantageously taken into consideration already at the time of developing the geometry of the mesostructure.

As opposed to other manufacturing methods, such as e.g. milling, generative manufacturing methods have the advantage that nearly every geometry can be manufactured by means of this method and thus no production related limitations must be taken into account when developing or optimizing the geometry of the mesostructure.

According to another aspect a mesostructure is provided which was manufactured by using the above-described method of manufacturing a mesostructure.

According to another aspect a device or system is provided which is designed to perform the method of developing a geometry of a mesostructure and/or of manufacturing a mesostructure, the method being defined and illustrated in one of the above paragraphs.

According to another aspect a computer-readable medium comprising program code instructions executable by a computer is provided for performing a method of developing a geometry of a mesostructure and/or for manufacturing a mesostructure the method being defined and illustrated in one of the above paragraphs.

According to another aspect a computer program comprising program code means for performing the method of developing a geometry of a mesostructure and/or for manufacturing a mesostructure is provided, the method being defined and illustrated in one of the above paragraphs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Below, the invention will be explained in more detail with reference to several exemplary embodiments and the accompanying drawing, in which.

DETAILED DESCRIPTION OF THE INVENTION

The following description of the preferred embodiment(s) is merely exemplary in nature and is in no way intended to limit the invention, its application, or uses.

First of all, the use of the terms "superstructure" and "mesostructure" is to be explained in more detail.

Figure 1:
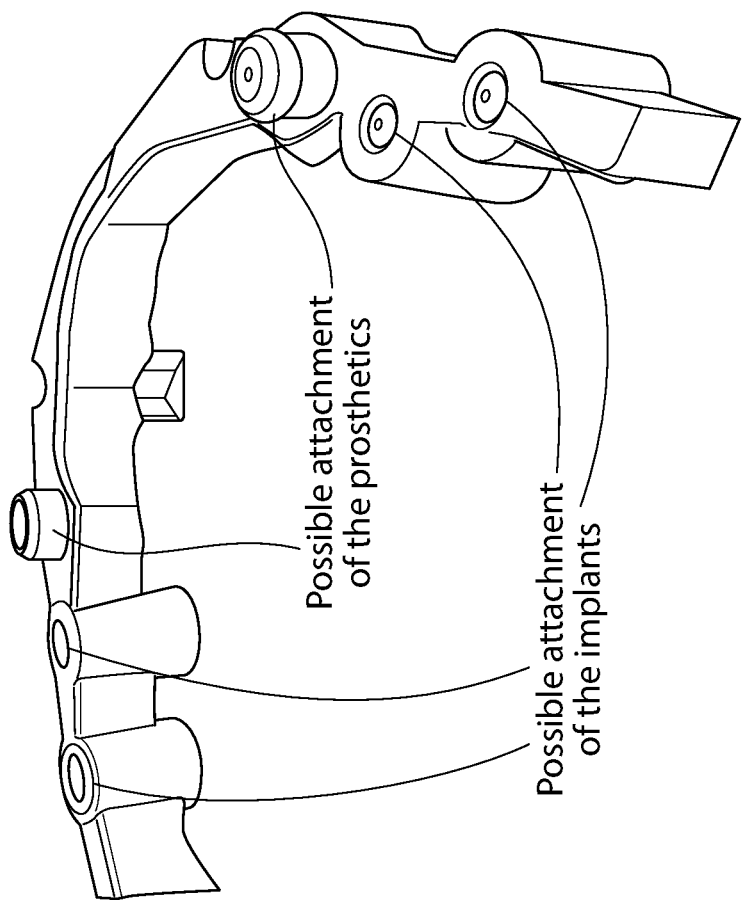
FIG. 1 shows a first example of a mesostructure.
Figure 2:
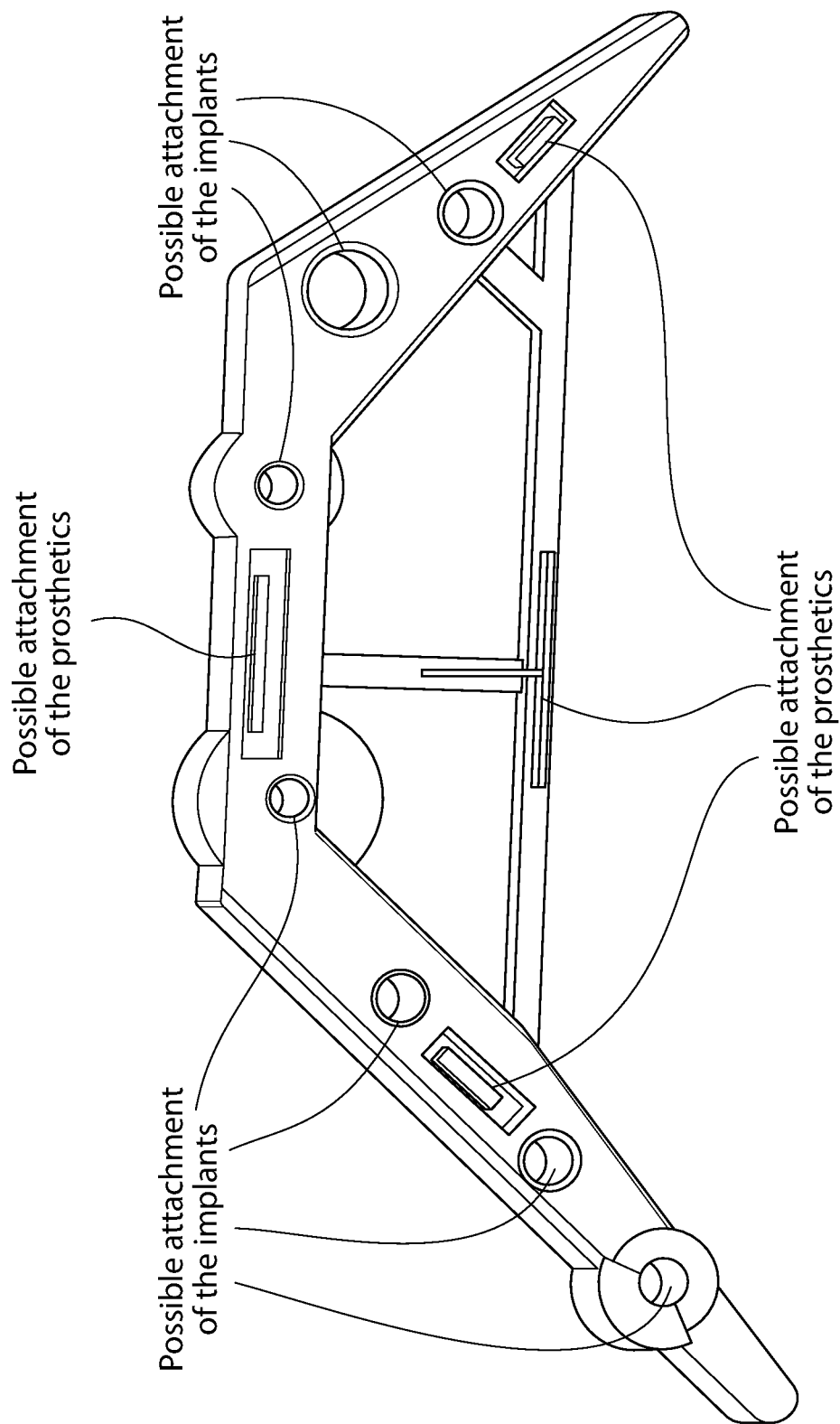
FIG. 2 shows a second example of a mesostructure.

A superstructure usually refers to all those parts that are placed onto or attached to the implants or abutments, respectively. A mesostructure refers to an intermediate link, e.g. a web, attachment bars, or special design which is arranged between the implants and the prosthesis or the denture. Thus, the term superstructure covers, for example, both the mesostructure and the prosthesis. However, such a distinction is not always made very clearly, so that sometimes only the intermediate link, for example, a web or attachment bars are referred to as superstructure. In addition, the English language does not have an exact equivalent of the German term "Mesiokonstruktion" [mesostructure]. Therefore, it may be that the English term "superstructure" only refers to the intermediate link, in particular the web or the attachment bars. FIGS. 1 and 2 show different examples of mesostructures.

Optimization processes allow optimizing the geometries with respect to defined target values. Thereby, additional conditions that are to be considered in the optimization may be defined. Such an optimization method is e.g. the topology optimization. An installation space, a load absorption and possible fixed points are predetermined. On this basis, by means of observing objective functions and constraints, a computer calculates a geometry which is designed such that, for example, with a volume (or weight) as low as possible or other target values or objective functions, by observing at least one constraint (e.g. permissible maximum strain) the best geometric structure is created, to the effect that the load is carried off ideally. For this purpose, all those regions are removed that do not contribute or only insignificantly contribute to the load absorption, this taking place by observing the constraint (e.g. a pre-given tensile stress is not exceeded). Alternatively, as a target function also the flexibility may be minimized, specifying a volume reduction of e.g. 70% (constraint).

This method now is to be used for the construction of mesostructures generally used to attach dental prostheses to the jawbone.

The topology optimization is to result in a completely new design of the current process. For this purpose, the dentist specifies possible positions for the implants. Then, a possible design space (installation space) is defined for the superstructure on the basis of the oral cavity and the dental prosthesis. As additional information, the position(s) and the contributions of the force application are defined. From this information, the computer calculates the optimum geometry of the superstructure via the topology optimization and further methods such as the finite element method, so that e.g. a minimum weight is achieved, with at the same time maximum stillness or a defined service life.

Thereby, a biomechanically optimized shape of the superstructure and possibly further information are obtained, for example, on which an implant is needed or on which implants are needed, since this does/these do not bear any application of load.

Another effect is that no CAD designer (e.g. dental technician) is required or is required to a limited extent only, since the previous manual drawing of the superstructure is mainly effected in the special CAD programs by a computer algorithm.

The automatically calculated superstructure is subjected to hardly any constraints, with the exception of the defined installation space, when being produced by a 3D manufacturing method allowing to produce almost any geometry.

In dimensioning the mesostructure and the definition of the (additionally) required implants, so far the dental technician usually relies on his knowledge and experience or also on the empirical values of other dental technicians. However, the respective individual biomechanical properties of the jaw are hardly taken into consideration or at least are considered too little and, in the majority of cases, the statics of the mesostructure is not calculated accurately either.

In particular when developing the geometry of a mesostructure for an "abnormal" jaw, that is to say a jaw that is lacking bone regions, for example due to a tumor resection, the method is particularly useful. In such a case, the implants necessary for the mesostructure can be anchored only on certain points in the bone, which may possibly result in bad load absorption and makes necessary a special geometry of the mesostructure, a so-called "special design." FIG. 2 shows an example of such a special design.

A manual developing of the geometry of such a special design of a mesostructure by means of a CAD program, without consideration of the biomechanical properties of the jaw and the statics of the mesostructure may easily result in a very unfavorable load distribution or load absorption.

In addition, there is a danger that when developing the geometry of such a special design of a mesostructure manually with the help of a CAD program, without consideration of the biomechanical properties of the aw and the statics of the mesostructure, implants are planned and inserted which do not absorb any load, that is to say implants upon which no force at all or only very little force is exerted during chewing, when the dental prosthesis is inserted, which means that it would not have been necessary to insert the implants for the attachment of the mesostructure.

Moreover, especially in such special cases, the respective dental technician frequently dimensions the mesostructures or parts thereof stronger than would physically be necessary, so as to ensure that the mesostructure is sufficiently stable in any event. This leads to additional costs and may also have an adverse effect from an aesthetic point of view.

Therefore, the method is particularly useful in developing the geometry of a mesostructure for an "abnormal" jaw requiring a special design.

The method will explained in more detail below.

A simulation based on a finite element method (FEM) is carried out on a computer with the help of a simulation software program stored on its storage device or any other storage device, such as e.g. ANSYS (computer program product).

A FEM network may be effected e.g. by means of a FEM simulation software program stored on a storage device of the computer or on any other storage device of a separate computer, or corresponding FEM networking software.

This allows to simulate mechanical loads occurring in future actual use of the mesostructure (i.e. during chewing with the prosthesis inserted).

Based on a 3D installation (design space) defining the maximum spatial extension of the mesostructure, the above described simulation is carried out iteratively, in which connection in each iteration regions not contributing to the load absorption or contributing thereto only slightly are removed. More precisely, a pseudo-density having a value between 0 and 1 is allocated to each element of the geometry to be optimized, which describes whether the respected element in the design space is necessary (pseudo density 1) or can be neglected (pseudo density 0).

The attending dentist or dental surgeon advantageously specifies the 3D installation space in terms of practical and aesthetic aspects. However, the dental prosthesis should still be appropriately positionable, the tongue should have enough room and freedom to move and normally it should not be possible to see the mesostructure. Consequently, it is expedient that the dentist or oral surgeon specifies, as a starting point of optimization, a 3-D installation space which is as large as possible, however, which still complies with the above cited criteria.

The step-by-step biomechanical optimization of the geometry of the mesostructure advantageously takes place automatically with the aid of the topology optimization program. In each iteration, the remaining, 3D installation space is reduced in size or is adapted according to the specifications, that is to say the target function(s) and constraint(s), until a biomechanically optimized geometry is obtained in the last iteration.

After optimizing, pseudo densities having values between 0 and 1 are allocated to the installation space. Usually, the majority of the values is close to 0 or 1. However, values therebetween are also possible. The distribution of the values of the pseudo density depends on the respective optimization.

The optimized geometry is now exported, wherein only those parts of the geometry are exported whose pseudo density is within a certain range (e.g. 0.8 to 1), which is defined by a user or by a certain logic. Thus, the user of the logic determines how much material is actually exported and thus determines the appearance of the optimized geometry.

The exported topology-optimized geometry is then smoothed.

Alternatively, an additional optimization method, for example, the so-called shape optimization might be used for stress reduction for finishing the optimized geometry. In contrast to the topology optimization, in the shape optimization the surface is deformed (morphed) in a defined region in order to further reduce stress peaks.

For the optimization of the mesostructure possible positions for attaching the mesostructures are defined, which are excluded from optimization, i.e. are part of the optimized geometry of the mesostructure in any case.

The possible positions for attaching the mesostructure may include possible positions for one or several implants and/or—for the case that the patient still has at least one remaining natural tooth, which after appropriate preparation is suitable for attaching the mesostructure—the position of the remaining tooth or the positions of the remaining teeth which is/are used for attaching the mesostructure.

The possible positions for inserting implants for attaching the mesostructure is/are advantageously predetermined by the attending dentist or oral surgeon. Expediently, the dentist or oral surgeon determines these by appropriate examinations of the bone structure of the upper jaw and/or the lower jaw or on the basis of existing clinical findings, so that a reliable attachment of the mesostructure and thus a good fit of the dental prosthesis attached thereto are ensured also when the dental prosthesis is under load.

The position(s) of the still existing tooth or the still existing teeth that after appropriate preparation is/are suitable for attaching the mesostructure is/are likewise predetermined by the dentist or oral surgeon. If necessary, he determines the current positions of the existing tooth or the existing teeth one more time, to achieve maximum accuracy. If the attachment of the mesostructure, to which the dental prosthesis is to be attached, additionally requires one or more implants, one or several possible positions are provided for it by the dentist or oral surgeon, as is described above.

In addition, for the optimization of the mesostructure possible positions or regions are defined which are suitable for attaching the dental prosthesis to the mesostructure.

The positions or regions at which the dental prosthesis can be attached depend on the type and quality, that is the individual design of the dental prosthesis and the type of mesostructure, e.g. web, attachment bars or special designs. The positions or regions at which the dental prosthesis can be attached are also advantageously predetermined by the attending dentist or oral surgeon or prosthesist.

If the respective mesostructure is manufactured such that the position of the attachment points or attachment regions of the prosthesis is predetermined in a variable manner, that is to be not fixed, the arrangement of these attachment points or attachment regions of the processes may also be optimized biomechanically.

In a preferred embodiment the number of possible positions for implants is larger than the number of the implants required for the attachment of the mesostructure, so that in the optimization of the geometry of the mesostructure those positions for implants can be ascertained from the overall number of the possible positions for implants which are best suited for attaching the mesostructure. Thus, also the arrangement of the implants for attaching the mesostructure is biomechanically optimized in that a suitable subset of positions for implants is ascertained from the overall number of possible positions for implants. Thus, on the one hand, for example, it is possible to remove possible positions for implants which absorb no load or no significant load and, on the other hand, it is possible to avoid too high a load of an individual implant or too high a load absorbed on a single implant.

For this purpose, the focus is on that region of the mesostructure which comes into contact with the corresponding implant, that is to say the region via which the application of force/absorption of force between the implant and the mesostructure takes place directly. If no (essential) load absorption takes place at a certain region of the mesostructure, then no (essential) load absorption takes place either across the entire implant which is in contact with a certain region of the mesostructure.

Advantageously, at least one of the following goals or target functions can be specified for optimizing the geometry of the mesostructure:

The volume or mass of the mesostructure may be minimized by removing e.g. regions which do not contribute or contribute only slightly to load absorption or the load removal.

The flexibility of the mesostructure may be minimized, wherein this may take place for any load scenario, that is e.g. for any individual specified load or for a load group. The used load scenario is based on the biting force (or chewing force) of the person for which the mesostructure and the dental prostheses are manufactured.

Thus, the geometry of the mesostructure can be optimized both for a static biting force of a certain person in an individualized manner and for several loading conditions which, for example, represent a chewing cycle for certain person.

Furthermore, the shifting at a certain point or region of the mesostructure, which may optionally be specified, can be minimized in accordance with a target function and or forced function.

The reaction force on the possible positions for attaching the mesostructure, for example, to all implants or also to a single implant, can be minimized.

Expediently, in the optimization of the geometry of the mesostructure at least one specified condition, which is frequently also called a constraint, may be taken into consideration.

For example, at least one fixed point of the geometry of the mesostructure may be specified as an additional condition. If at least one fixed point is specified, this at least one fixed point is necessarily contained in the optimized geometry of the mesostructure.

A permissible maximum load of individual portions of the mesostructure may also be specified.

In this connection, the optimization of the geometry of the mesostructure may be individualized by stating the expected maximum load of the entire mesostructure or, more precisely, of a maximum entire load scenario to be expected across the possible positions for attaching the dental prosthesis, with respect to a load scenario of the person for which the mesostructure and dental prosthesis are manufactured.

Thus, for a person having a rather low maximum biting force the mesostructure may be dimensioned to be less strong or smaller in size, which, in particular, is of advantage for persons with a small oral cavity. Vice versa, for a person with a high maximum biting force, the mesostructure may be dimensioned to be stronger or larger, to thus avoid any overloading of individual sections of the mesostructure and thus deformation or even breakage of the mesostructure.

If one can choose from different materials for the mesostructure, their properties may also be included in the optimization of the geometry of the mesostructure by adapting the permissible maximum load of individual sections of the mesostructure to the respective material.

Furthermore, overloading of individual implants can be avoided specifying a permissible maximum reaction force at the possible positions for attaching the mesostructure, that is e.g. a permissible maximum load of an individual implant. Stating the expected maximum load of the entire mesostructure or, more precisely, of a maximum overall load absorption to be expected across the possible positions for attaching the dental prosthesis, the optimization of the mesostructure with respect to the biting force of the person, for which the mesostructure and the dental processes are manufactured, may be individualized.

If after optimizing the geometry of the mesostructure a higher load of a certain implant cannot be avoided, then this implant can be adapted correspondingly. In particular, for example, the length and diameter of the implant can be increased.

The permissible maximum volume or the permissible maximum weight of the mesostructure, permissible maximum stresses and/or a permissible maximum flexibility of the mesostructure may also be specified as an additional condition.

If one can choose from different materials for the mesostructure, these may also be included in the optimization of the geometry of the mesostructure by adapting the maximum weight, the permissible maximum stresses and/or the permissible maximum flexibility of the mesostructure to the respective material.

When a combination of different additional, material-depending conditions is specified, e.g. of the permissible maximum load of individual sections of the mesostructure, of the maximum weight of the mesostructure, of the permissible stresses and/or the permissible maximum flexibility of the mesostructure is specified, then for each available material the relevant combination of the conditions matching the respective material may be specified or tested, respectively. Thus, in the optimization of the geometry of the mesostructure the material to be used may also be "optimized," i.e. the material which is suited best for the individual requirements of the mesostructure.

Advantageously, this above cited goals (target functions) and conditions (force conditions) may be combined in a suitable or reasonable manner.

Thus, minimization of the flexibility for a predetermined load or a predetermined load group and a predetermined volume reduction (e.g. 70%) may take place or minimization of the volume or mass, for a permissible maximum stress (and thus the lifetime) and/or for the permissible maximum reaction force (e.g. 30N) may take place on the implants.

The expected maximum load scenario of the individual person may be ascertained or estimated by means of an individual measurement, a pre-calculation such as FEM or with the aid of specialist literature.

In another preferred embodiment the mesostructure may be part of a one-piece construction comprising the mesostructure and the denture. Thus, in a one-piece embodiment of the mesostructure and denture the geometry of the part corresponding to the mesostructure may be optimized with the aid of the method disclosed herein.

After optimizing, pseudo densities having values between 0 and 1 are allocated to the installation space. Usually, the majority of the values is close to 0 or 1. However, values therebetween are also possible. The distribution of the values of the pseudo density depends on the respective optimization.

The optimized geometry is now exported, wherein only those parts of the geometry are exported whose pseudo density is within a certain range (e.g. 0.8 to 1), which is defined by a user or by a certain logic. Thus, the user of the logic determines how much material is actually exported and thus determines the appearance of the optimized geometry.

The exported topology-optimized geometry is smoothed and, if required, finished by e.g. a dental technician, the dental technician having the option of also varying the position of the attachment points for implants and dental prosthesis in case of need.

Alternatively, an additional optimization method, for example, the so-called shape optimization might be used for stress reduction in the process of finishing the optimized geometry. In contrast to the topology optimization, in the shape optimization the surface is deformed (morphed) in a defined region in order to further reduce stress peaks.

Next, the smoothed and possibly post-edited data are converted into a suitable geometry format, e.g. an STL file or a CAD file.

If needed, a cam (computer-aided-manufacturing-) file is produced on the basis thereof.

Based on the generated data, e.g. STL, CAD, CAM data or any other file format required by the respective device for the production, the mesostructure can be manufactured with the aid of a suitable manufacturing method, e.g. 3D printing or an additive manufacturing method or milling.

Expediently, the mesostructure can be made of a metal or a metal alloy or a plastic.

Advantageously, cobalt, chromium, molybdenum, titanium or alloys of these metals may be used together with another metal, in particular molybdenum. In addition, zirconium oxide or also plastics that are orally compatible and non-toxic may be used.

For the production or manufacture of the mesostructure based on the previously developed geometry of the mesostructure for a dental prosthesis a suitable production or manufacturing method may be selected, depending on the desired material of the mesostructure. This may include the use of generative manufacturing methods, also referred to as additive manufacturing methods or 3D printing, such as e.g. sintering, laser sintering, selective laser melting or electron beam melting for metals and metal alloys and stereolithography or fused deposition modeling for plastics. Mesostructures made of metal or metal alloys may also be milled, wherein the production-related limitations in milling are advantageously taken into consideration already at the time of developing the geometry of the mesostructure.

As opposed to other manufacturing methods, such as e.g. milling, generative manufacturing methods have the advantage that nearly every geometry can be developed by means of this method, and thus no production-related limitations must be taken into account when developing or optimizing the geometry of the mesostructure.

It will be appreciated by persons skilled in the art that the above embodiments have been described by way of example only and not in any limitative sense, and that various alterations and modifications are possible without departure from the scope of the protection which is defined by the appended claims.

What is claimed is:

1. A method of developing a geometry of a meso structure for a dental prosthesis, the method comprising:
   receiving first 3D data defining an initial 3D installation space of an oral cavity with regions removed to allow freedom of motion of a tongue;
   receiving second 3D data defining possible positions within the oral cavity for attaching a mesostructure to the oral cavity, wherein the possible positions for attaching the mesostructure to the oral cavity include possible implant location positions within the oral cavity and/or positions within the oral cavity at which existing teeth are located;
   receiving third 3D data defining possible positions or regions that are suitable for an attachment point between the mesostructure and a dental prosthesis;
   developing the mesostructure with a geometry that is optimized using the first 3D data, the second 3D data, and the third 3D data; and
   wherein optimizing the geometry of the mesostructure comprises iteratively removing regions from the initial 3D installation space that have a load absorption value that is below a predetermined limit value.

2. The method according to claim 1, wherein the geometry of the mesostructure is calculated by a computer with the aid of an topology optimization technique.

3. The method according to claim 1, wherein the initial 3D installation space defines a maximum spatial expansion of the mesostructure.

4. The method according to claim 1, wherein the regions that are removed from the initial 3D installation space are determined by simulating the forces and/or shiftings acting on individual regions of the mesostructure.

5. The method according to claim 1, wherein a number of possible implant location positions within the oral cavity is larger than a number of implants necessary for attaching the mesostructure to the oral cavity.

6. The method according to claim 5, wherein the geometry of the mesostructure is optimized by removing possible positions of implants on which no or no significant load absorption takes place.

7. The method according to claim 1 further comprising:
   simulating forces or shifts acting on a plurality of individual regions of the mesostructure to determine a load absorption value for each of a plurality of individual regions of the initial 3D installation space, each of the plurality of individual regions of the initial 3D installation space being associated with one of the plurality of individual regions of the mesostructure; and
   comparing the load absorption value of each of the plurality of individual regions of the initial 3D installation space with the predetermined limit value.

8. A method of manufacturing a mesostructure for a dental prosthesis, the method comprising:
   developing a geometry of a mesostructure for a dental prosthesis according to the method according to claim 1, and
   manufacturing the mesostructure for a dental prosthesis based on the developed geometry of the mesostructure for a dental prosthesis with the aid of a generative manufacturing method or by means of milling.

* * * * *